US011149798B2

(12) United States Patent
Yazigi (10) Patent No.: US 11,149,798 B2
(45) Date of Patent: Oct. 19, 2021

(54) ROTARY CLUTCH ASSEMBLY WITH ACTUATOR HAVING THREADINGLY ENGAGED TWO-COMPONENT ARMATURE

(71) Applicant: Litens Automotive Partnership, Woodbridge (CA)

(72) Inventor: Bashar Yazigi, Brampton (CA)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 61 days.

(21) Appl. No.: 16/632,451

(22) PCT Filed: Jul. 20, 2018

(86) PCT No.: PCT/CA2018/050886
§ 371 (c)(1),
(2) Date: Jan. 20, 2020

(87) PCT Pub. No.: WO2019/014777
PCT Pub. Date: Jan. 24, 2019

(65) Prior Publication Data
US 2020/0232516 A1 Jul. 23, 2020

Related U.S. Application Data

(60) Provisional application No. 62/534,876, filed on Jul. 20, 2017.

(51) Int. Cl.
*F16D 13/08* (2006.01)
*F16D 27/105* (2006.01)

(52) U.S. Cl.
CPC ........... *F16D 13/08* (2013.01); *F16D 27/105* (2013.01)

(58) Field of Classification Search
CPC .................. F16D 13/08; F16D 13/025; F16D 2027/007; F16D 27/10; F16D 27/105
See application file for complete search history.

(56) References Cited

U.S. PATENT DOCUMENTS

| 4,466,522 A | 8/1984 | Shibuya |
| 8,517,698 B2 * | 8/2013 | Cochran ............... F16D 27/112 417/319 |

(Continued)

OTHER PUBLICATIONS

Gordon, Jacques, Cooling System: Variable Displacement A/C Compressor, Motor Age, Apr. 2005, pp. 54-56.

(Continued)

*Primary Examiner* — Charles A Fox
*Assistant Examiner* — Lori Wu
(74) *Attorney, Agent, or Firm* — Millman IP Inc.

(57) ABSTRACT

A rotary clutch uses a wrap spring clutch. An actuator generates a drag force to control the wrap spring clutch to engage or disengage the clutch. The actuator includes an electromagnet, a two-component armature and an axial return spring. The two-component armature includes first and second components threadingly connected one another for relative axial translation as they rotate relative to one another, and an angular position biasing member connecting them. The second component translates axially under magnetic force from the electromagnet, and when stopped by the electromagnet the first armature component translates axially due to their threaded connection. Due to the previous axial movement of the floating component the translation of the first armature component occurs in conditions where the air gap and reluctance of a magnetic circuit is reduced compared to the prior art, and thus the overall strength of the applied magnetic field can be comparatively reduced.

7 Claims, 5 Drawing Sheets

(56) References Cited

U.S. PATENT DOCUMENTS

| | | | |
|---|---|---|---|
| 9,038,799 B2* | 5/2015 | Mevissen | F16D 27/105 |
| | | | 192/90 |
| 2004/0182670 A1 | 9/2004 | Nojiri et al. | |
| 2009/0314600 A1 | 12/2009 | Kato et al. | |
| 2011/0268593 A1 | 11/2011 | Yamada et al. | |
| 2013/0098730 A1 | 4/2013 | Danciu et al. | |
| 2014/0238809 A1 | 8/2014 | Boyes et al. | |

OTHER PUBLICATIONS

Air Conditioning and Heating System, http://www.musclecarclub.com/library/tech/air-conditioning.shtml, as early as Oct. 18, 2013.
Air Conditioning Compressors, Delphi, Luxembourg, 2006.
International Search Report and Written Opinion of PCT/CA2018/050886 dated Oct. 1, 2018.

* cited by examiner

ROTARY CLUTCH ASSEMBLY WITH ACTUATOR HAVING THREADINGLY ENGAGED TWO-COMPONENT ARMATURE

CROSS-REFERENCE TO RELATED APPLICATIONS

This application claims priority from U.S. Provisional Patent Application Ser. No. 62/534,876, filed Jul. 20, 2017, the contents of which are incorporated herein by reference in their entirety.

FIELD

This disclosure relates to rotary clutch assemblies.

BACKGROUND

A rotary clutch assembly which utilizes wrap spring clutches can be controlled by an actuator that employs an axially moveable armature driven by an electromagnet. The electromagnet is a major cost driver in the device, and it would be useful to have an improved rotary clutch assembly with an electromagnet of comparatively reduced power requirement to control the assembly.

SUMMARY

In one aspect, a rotary clutch assembly is provided which includes a first rotary clutch portion that is disposed about a rotary axis and adapted to receive a rotary input and a second rotary clutch portion that is disposed about the rotary axis and adapted to be coupled to a rotary output, wherein at least one of the first and second rotary clutch portions defines a clutch surface. A wrap spring clutch, having a power transfer end, a control end and a plurality of helical coils between the power transfer end and the control end engaging the clutch surface, is configured to transmit or interrupt flow of rotary power between the first rotary clutch portion and the second rotary clutch portion depending on a drag force applied to the control end of the wrap spring clutch. An actuator is selectively operable for generating the drag force. The actuator includes an electromagnet, a two-component armature and an axial return spring. The two-component armature includes a first component, a second component threadingly connected to the first component so that the first and second armature components are capable of relative axial translation as the first and second armature components rotate relative to one another, and an angular position biasing member connecting the first and second components. The axial return spring is connected to the first armature component. The second armature component translates axially under magnetic force applied by the electromagnet. With the second armature component stopped by the electromagnet the first armature component translates axially due to the threaded connection between the first and second armature components. In this manner, due to the previous axial movement of the floating component the translation of the first armature component occurs in conditions where the air gap and reluctance of a magnetic circuit is reduced in comparison to the prior art, and thus the overall strength of the applied magnetic field can be comparatively reduced.

The angular position biasing member preferably biases the first and second armature components towards an axially extensible condition.

The first armature component and the second armature component preferably have a range of relative angular motion therebetween less than 360 degrees.

One of the first and second armature components can include a channel and the other of the first and second armature components can include a projection constrained by the channel. The channel and projection enable the first and second armature components to translate axially relative to one another as the first and second armature components rotate relative to one another.

The channel can have a wide cross-sectional area and a narrow cross-sectional area, and the angular position biasing member can bias the armature component having the projection to a position where the projection is disposed in the wide cross-sectional area.

The second armature component can be positioned to a first angular position relative to the first armature component where the second armature component has axial play relative to the first armature component. The second armature component can be positioned to a second angular position relative to the first armature component where the first armature component has substantially no axial play relative to the first armature component, the angular position biasing member biasing the second armature component to the first angular position.

BRIEF DESCRIPTION OF DRAWINGS

The foregoing and other aspects of the disclosure can be better appreciated with reference to the accompanying drawings, wherein.

DETAILED DESCRIPTION

Figure 1:
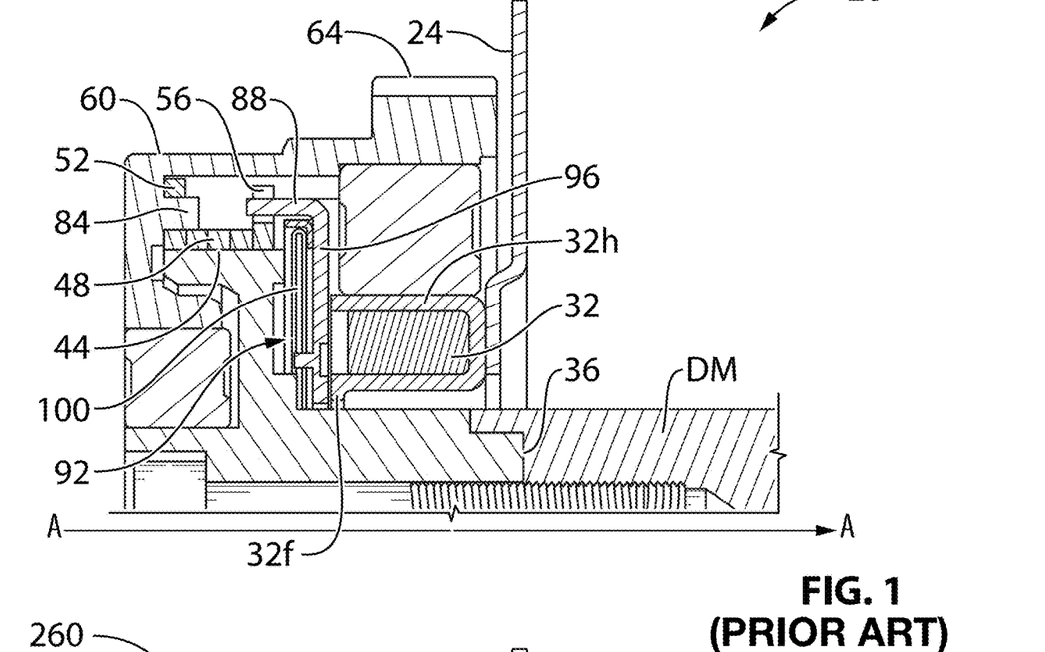
FIG. 1 is a cross-sectional view of a portion a prior art rotary clutch assembly that utilizes a contracting type wrap spring clutch.
Figure 2:
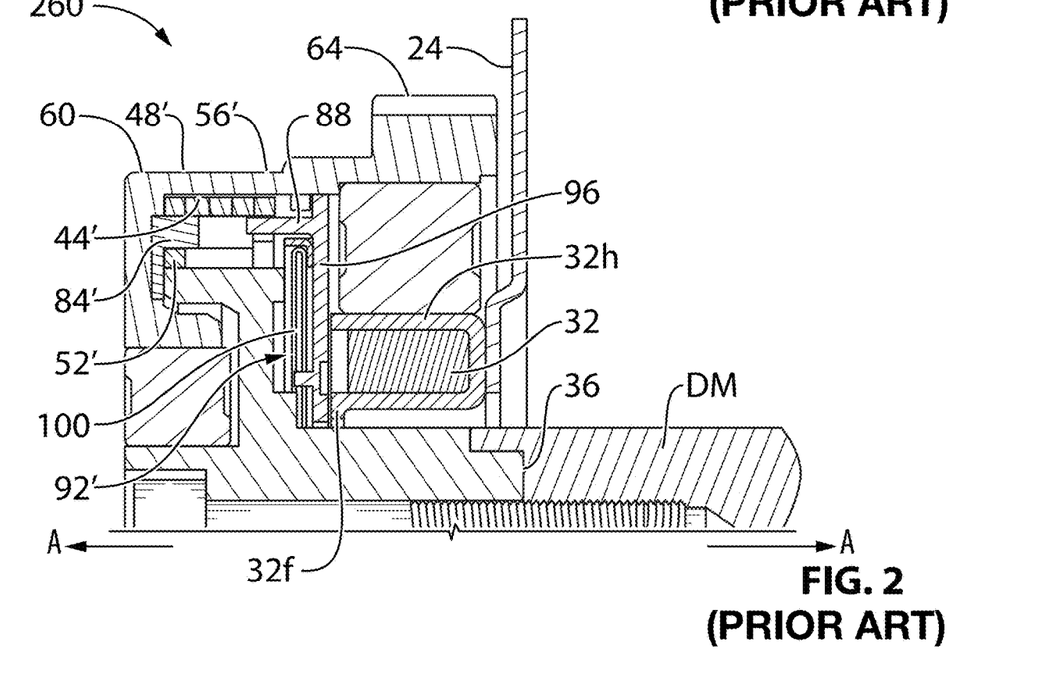
FIG. 2 is a cross-sectional view of a portion a prior art rotary clutch assembly that utilizes an expansible type wrap spring clutch.

The exploded view of FIG. 1 and the cross-sectional view of FIG. 2 show a rotary clutch assembly 20 that is explained in detail in U.S. Pat. No. 8,627,935, the contents of which are included herein in their entirety. In summary, the rotary clutch assembly 20 includes a first rotary clutch portion which is an input rotary clutch portion, such as inner rotary member 36, that is disposed about a rotary axis A-A and adapted to receive a rotary input such as a shaft driving member DM. The inner rotary member 36 defines a clutch surface, such as a torque transfer surface 44. A second rotary clutch portion, which may be an output rotary clutch portion, such as outer rotary member 60, is disposed about the rotary axis A-A and adapted to be coupled to a rotary output, such as a sprocket 64. A wrap spring clutch 48 transmits or inhibits the flow of rotary power to the output rotary clutch portion from the inner rotary member 36. More particularly, the wrap spring clutch 48 has a first or power transfer end 52, a second or control end 56 and a plurality of helical coils therebetween for engaging the torque transfer surface 44. In rotary clutch assembly 20 the wrap spring clutch 48 is a 'closing' spring in the sense that its helical coils contract about the torque transfer surface 44 to enable the transfer of torque from the inner rotary member 36 to the outer rotary member 60. The power transfer end 52 of the wrap spring clutch 48 engages a drive pin 84 in the outer rotary member 60. The control end 56 of the wrap spring clutch 48 controls the contraction of the helical coils against the torque transfer surface 44, as discussed below. In rotary clutch assembly 20 at least some of the helical coils of the wrap spring clutch 48 may be configured with a nominal diameter less than the diameter of the torque transfer surface 44 such that the wrap spring clutch 48 is in gripping engagement with the torque transfer surface 44 as the inner rotary member 36 rotates in a predetermined direction, whereby the wrap spring clutch 48 rotates in conjunction with the rotation of the inner rotary member 36. The clutch assembly 20 is thus said to be "normally engaged".

An actuator controls the relative position of the wrap spring clutch control end 56. The actuator includes an electromagnet 32 and an armature 92 comprising an armature plate 96 and a biasing spring 100. The electromagnet 32 is fixed to housing 24. The armature 92 is rotatable about the rotary axis A-A relative to the inner rotary member 36. The armature 92 includes a control fork 88 which engages the wrap spring clutch control end 56. The return spring 100 biases the armature 92 away from the electromagnet 32 and against the inner rotary member 36. This urges the armature plate 96 to rotate with the inner rotary member 36 and prevents the armature plate 96 from contacting flange 32f of the electromagnet 32 thus inducing the armature 92 to rotate with the inner rotary member 36 and the clutch spring 48 in a substantially unimpeded matter. Contact between the power transfer end 52 of the wrap spring clutch 48 and the drive pin 84 will cause outer rotary member 60 to tend to rotate with the clutch spring 48. The rotary load on the outer rotary member 60 will resist rotation in the predetermined rotational direction, causing the helical coils of the clutch spring 48 to coil more tightly into engagement with the torque transfer surface 44 and thereby facilitate the transmission of rotary power from the input rotary clutch portion/inner rotary member 36 to the output rotary clutch portion/outer rotary member 60.

To disengage the clutch assembly 20, the electromagnet 32 is energized to generate a magnetic field that translates the armature 92 in an axial direction against the bias of the return spring 100 such that the armature 92 frictionally engages another member of the clutch assembly 20, such as electromagnet housing 32h. Frictional engagement between the armature 92 and the housing 32h creates a drag force that slows the rotation of the armature 92 relative to the coils of the clutch spring 48 (which tend to rotate with the torque transfer surface 44 of the inner rotary member 36) so that the armature 92, its control fork 88 and the wrap spring clutch control end 56 rotate relative to the inner rotary member 36 in a direction opposite the predetermined rotational direction. Relative rotation in this manner causes the helical coils of the clutch spring 48 to tend to uncoil from the torque transfer surface 44 and thereby halt or limit the rotary power that is input to the clutch spring 48 from the torque transfer surface 44 of the inner rotary member 36. Due to the rotary load on the outer rotary member 60, the rotary power transmitted between the torque transfer surface 44 and the helical coils of the clutch spring 48 would be insufficient to further drive the output rotary clutch portion/outer rotary member 60 despite continued rotation of the input rotary clutch portion/inner rotary member 36.

FIG. 2 shows a variation 200 of the clutch assembly 20 in which power flow is reversed. In the variant 200, the input rotary clutch portion is the outer rotary member 60 and the output rotary clutch portion is the inner rotary member 36. Wrap spring clutch 48' is an "opening spring" whose helical coils engage a clutch surface such as torque transfer surface 44' that is located on the inner diameter of the outer rotary member 60. At least some of the wrap spring clutch helical coils may have an outer diameter larger than the inner diameter defined by the torque transfer surface 44' and the coils are wound in a direction opposite to a predetermined rotational direction of the outer rotary member 60 portion so that the wrap spring clutch 48' tends to expand against the torque transfer surface 44' and rotate with rotation of the outer rotary member 60. The bias of the return spring 100 ensures that armature 92' contacts the outer rotary member 60 to induce expansion of the wrap spring clutch 48'. A power transfer end 52' of the wrap spring clutch 48' engages a drive lug 84' of the inner rotary member 36, and a control end 56' of the wrap spring clutch 48' is engaged by the armature 92'.

In the variant 200 contact between the power transfer end 52' and the drive lug 84' will cause the inner rotary member 36 to tend to rotate with the clutch spring 48' as the rotary load on inner rotary member 36 will resist rotation in the predetermined rotational direction, causing the helical coils of the clutch spring 48' to expand more tightly into engagement with the torque transfer surface 44' and thereby facilitate the transmission of rotary power from the outer rotary member 60/input rotary clutch portion to the inner rotary member 36/output rotary clutch portion.

To disengage clutch assembly 200 the electromagnet 32 is energized to generate a magnetic field that translates the armature 92' in an axial direction against the bias of the return spring 100 such that the armature 92' frictionally engages the electromagnet housing 32h, creating a drag force that slows the rotation of the armature 92' relative to the helical coils of the clutch spring 48' (which tend to rotate with the torque transfer surface 44' of the outer rotary member 60) so that the armature 92', its control fork 88 and the wrap spring clutch control end 56' rotate relative to the outer rotary member 60 in a direction opposite the predetermined rotational direction. This causes the helical coils of the clutch spring 48' to tend to contract and disengage from the torque transfer surface 44' thereby halting or limiting the rotary power that is input to the wrap spring clutch 48' from the torque transfer surface 44' of the outer rotary member 60, and thus inhibit rotary power transferred to the inner rotary portion 36/output rotary clutch portion.

From the foregoing embodiments it will be seen that the wrap spring clutch 48, 48' can be configured to transmit or interrupt flow of rotary power between the input rotary clutch portion and the output rotary clutch portion depending on a drag force applied to the control end 56, 56' of the wrap spring clutch.

In the foregoing embodiments the armatures 92, 92' rotate and translate axially. In order to induce this motion the armatures 92, 92' the electromagnet must generate sufficient force to overcome the bias of the return spring 100 when the air gap between the armature plate 96 and flange 32f of the electromagnet 32 is at its maximum, and wherein the reluctance in the magnetic circuit is at its highest.

FIGS. 3-6 show an improved rotary clutch assembly 300 which has a comparatively reduced magnetic force requirement and thus can have a comparatively lower cost as the ampere-turns of the electromagnet (which is a major cost driver) can be reduced. The reduction in required magnetic force is achieved in part by providing a two-component armature with (i) a floating component that is capable of axial translation under applied magnetic force, and (ii) a holding component that is threadingly linked to the floating component, capable of translating axially as the two components rotate relative to one another. The bias force of the return spring is applied to the holding component. The floating component can axially translate under applied magnetic field without having to overcome the bias of the return spring. Once the floating component is held by the electromagnet the holding component translates axially due to the mechanical linkage between the two components. But, due to the previous axial movement of the floating component the translation of the holding component occurs in conditions where the air gap and reluctance of the magnetic circuit is reduced in comparison to the prior art, and thus the overall strength of the applied magnetic field can be comparatively reduced.

Figure 3:
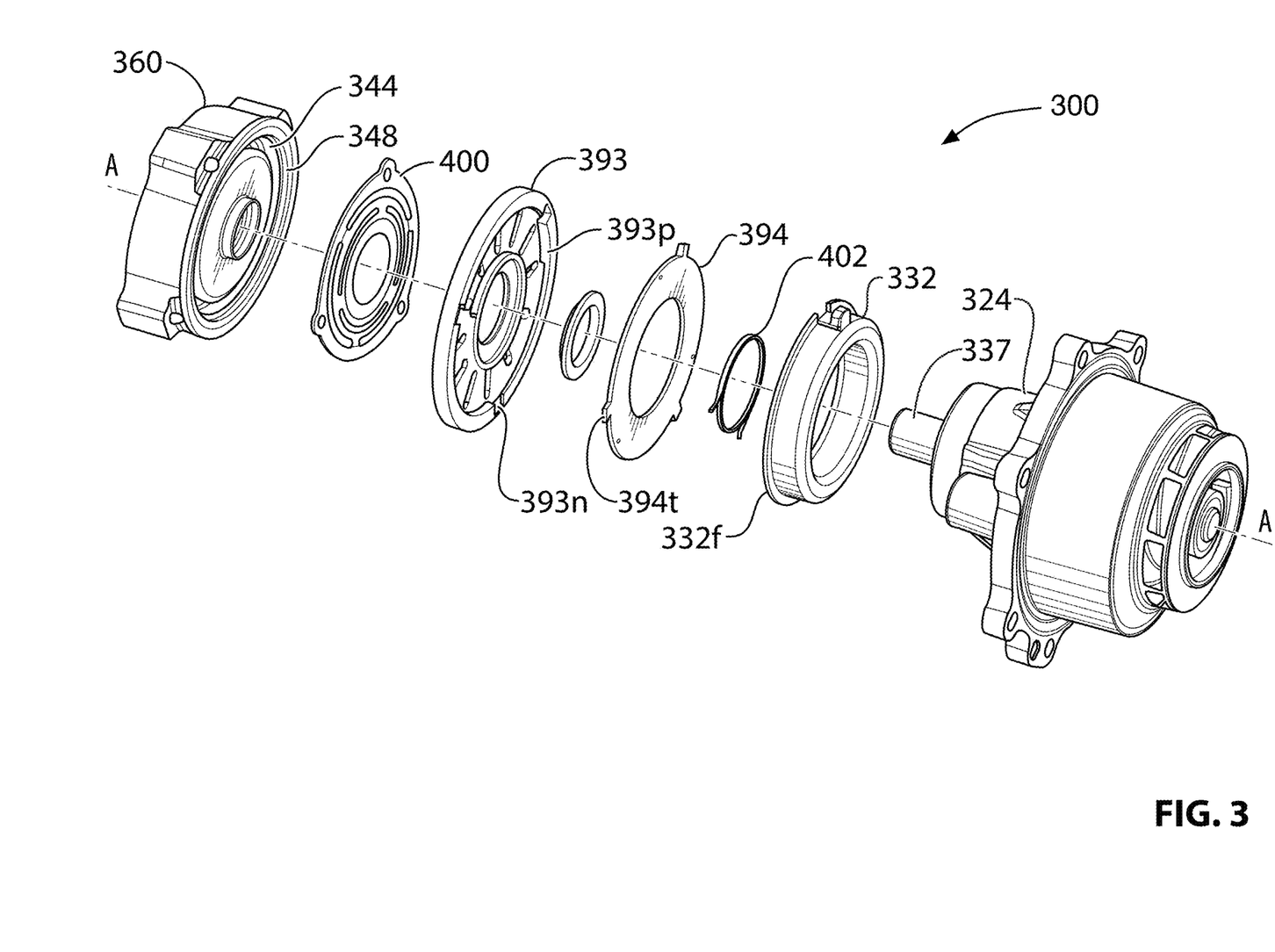
FIG. 3 is an exploded view of an embodiment of a rotary clutch assembly which has a reduced magnetic force requirement in comparison to the prior art clutches shown in FIGS. 1 and 2.
Figure 4:
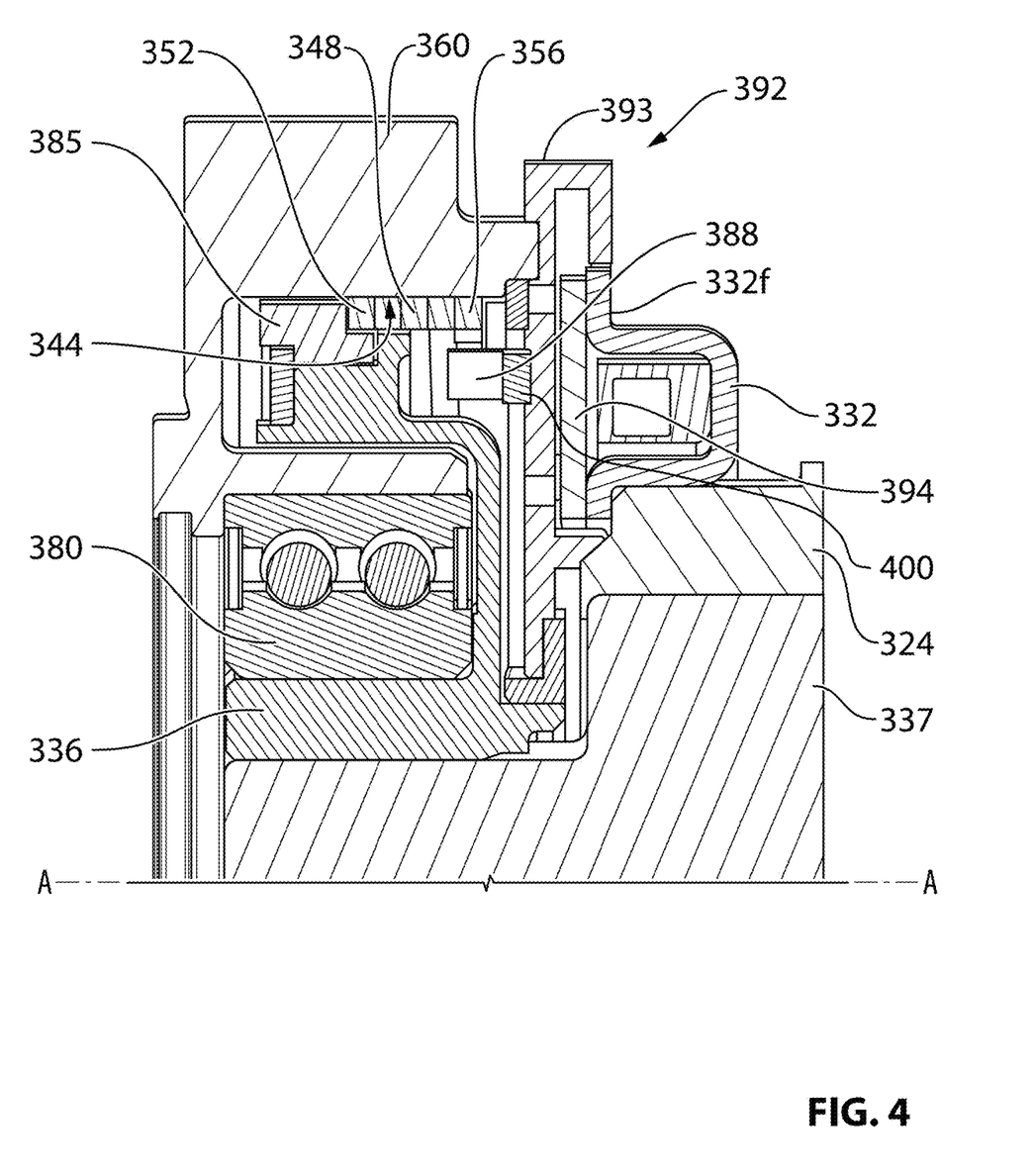
FIG. 4 is a partial cross-sectional view of the rotary clutch assembly shown in FIG. 3.
Figure 5:
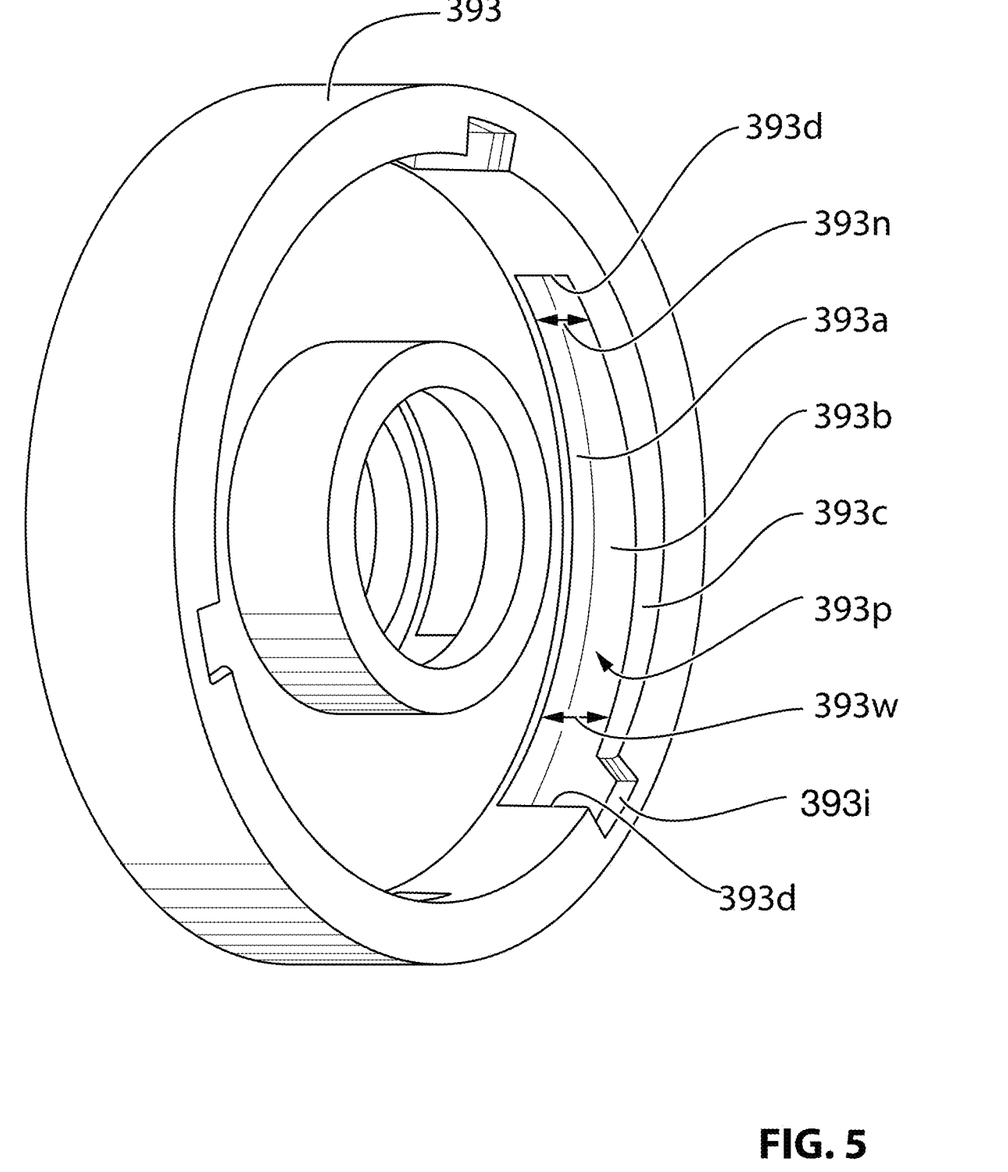
FIG. 5 is an isolated view of an armature component utilized in the rotary clutch assembly shown in FIG. 3.

In the rotary clutch assembly 300 shown in FIGS. 3-6 the input rotary clutch portion is an outer rotary member 360 disposed about a rotary axis A-A and the output rotary clutch portion is an inner rotary member 336 disposed about the rotary axis A-A. The outer rotary member 360 is capable of rotating relative to the inner rotary member via a bearing 380 (FIG. 4). The outer rotary member 360 may be connected to a toothed or untoothed sprocket or pulley (not shown) driven by an endless drive member such as a belt or chain. The inner rotary member 336 may be connected to—or integral with—a drive shaft 337 for an engine accessory such as a water pump.

The outer rotary member 360 defines a clutch surface, such as interior torque transfer surface 344. An expanding type wrap spring clutch 348 (FIG. 4) transmits or inhibits the flow of rotary power to inner rotary member 336 from the outer rotary member 360. More particularly, the wrap spring clutch 348 has a first or power transfer end 352, a second or control end 356 and a plurality of helical coils 348c therebetween for engaging the torque transfer surface 344. In rotary clutch assembly 300 the wrap spring clutch 348 is an 'opening' spring in the sense that its helical coils 348c expand against the torque transfer surface 344 to enable the transfer of torque from the outer rotary member 360 to the inner rotary member 336. The power transfer end 352 of the wrap spring clutch 348 engages a drive lug 384 (not shown) featured in the inner rotary member 336. A carrier 385 (seen only in the cross-sectional view of FIG. 4) guides the power transfer end 352 so that the radially facing end face of the power transfer end 352 engages the drive lug 384. (See FIGS. 3-6 of US Publication No. 2014/0238809, the entire contents of which are incorporated herein, for an example of a carrier.) The control end 356 of the wrap spring clutch 348 controls the contraction of the helical coils 348c relative to the torque transfer surface 344, as discussed below. In rotary clutch assembly 300 at least some of the helical coils 348c can be configured with a nominal diameter greater than the diameter of the torque transfer surface 344 such that the wrap spring clutch 348 is in gripping engagement with the torque transfer surface 344 as the outer rotary member 336 rotates in a predetermined direction, whereby the wrap spring clutch 348 rotates in conjunction with the rotation of the outer rotary member 360. The clutch assembly 300 can thus be "normally engaged".

An actuator controls the relative position of the wrap spring clutch control end 356. The actuator includes an electromagnet 332, a two-component armature 392 and an axial return spring 400. The electromagnet 332 is fixed to accessory housing 324.

The two-component armature 392 comprises a first component, such as holding component 393, and a second component, such as floating component 394, which is threadingly engaged to the first component and capable of relative axial translation as the two components rotate relative to one another.

The armature holding component 393 is rotatable about the rotary axis A-A relative to the outer rotary member 360. The holding component 393 includes a control fork 388 (seen in FIG. 4) which engages the wrap spring clutch control end 356. The axial return spring 400 biases the armature holding component 393 away from the electromagnet 332 and against the outer rotary member 360. This prevents the armature holding component 393 from contacting a flange 332f of the electromagnet 332 thus inducing the armature holding component 393 to rotate with the input rotary clutch portion/outer rotary member 360 and the clutch spring 348 in a substantially unimpeded matter. The armature holding component 393 is preferably formed from a non-magnetic material.

The armature floating component 394 is formed at least in relevant part from a magnetic material such as steel. The floating component 394 has a disc-like shape and is ensconced in the holding component 393.

More particularly, the holding component 393 as illustrated has at least one (three, as illustrated) circumferentially arranged pockets 393p (seen best in FIG. 5), each of which is defined by front and rear axially facing surfaces 393a, 393c, adjoining circumferential facing surface 393b, and channel end walls 393d. At least one of the front and rear axially facing surfaces 393a, 393c is axially angled with respect to the other such that the each circumferential pocket 393p is tapered in the axial direction with one end of the pocket 393p having a wider axial extent 393w than the axial extent 393n at the other end of the pocket 393p. In alternative embodiments both front and rear axially facing surfaces 393a, 393c can be correspondingly axially tapered.

Figure 6:
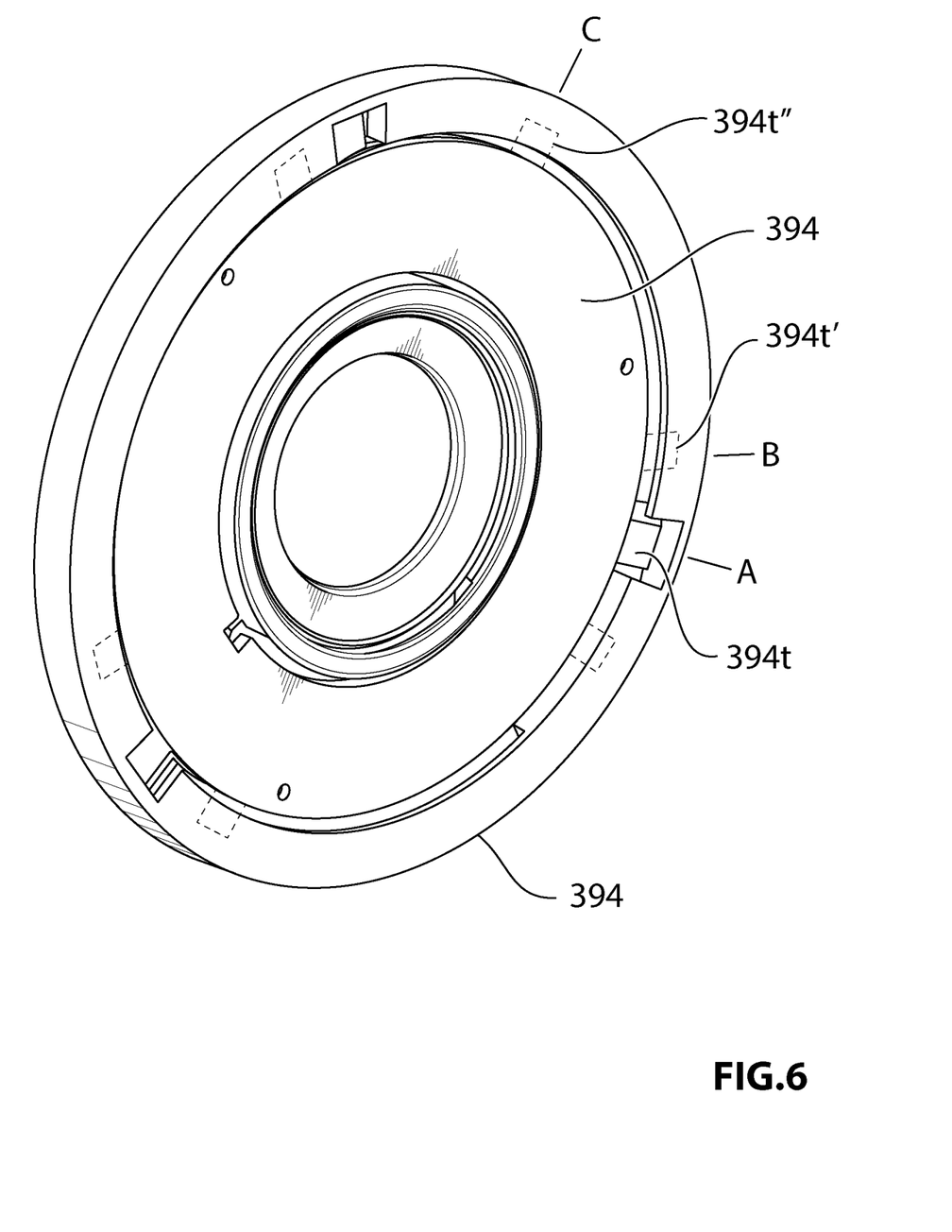
FIG. 6 is an isolated view of armature components utilized in the rotary clutch assembly shown in FIG. 3, showing how one component moves relative to the other component.

The floating component 394 features at least one (three, as illustrated) radially extending tabs 394t (seen best in FIGS. 3 and 6) that extend into respective pockets 393p such that the floating component 394 is capable of limited relative angular rotation with respect to the holding component 393; for example, 90 degrees. The tabs 394t have a thickness less than wide axial extent 393w and at least as thick as the narrow axial extent 393n. A notch 393i (seen best in FIGS. 3 and 5) is provided in each pocket 393p to enable the tabs 394t to enter the pockets 393p. An angular biasing member such as a coil spring 402 (FIG. 3) interconnects the floating component 394 with the holding component 393 and biases the floating component 394 to a particular angular orientation relative to the holding component 393. FIG. 6 is an isolated view of the floating component 394 installed in the holding component 393. In FIG. 6 the floating component 394 is shown in an install position, indicated by position "A", wherein the tabs 394t are aligned with the notches 393i. The coil spring 402 is stressed in the install position an will stabilize in a bias position. In the bias position as indicated by phantom tab 394t' at position "B", the tabs entrain the floating component 394 in the holding component 393. In the bias position, the tabs are disposed at or near the widest axial extents 393w in the pockets 393p yet. In an actuated position, as will be discussed in greater detail below, the tabs 394*t* are disposed at the narrowest extents 393*n* in the pockets 393*p* as indicated by phantom tab 384*t"* at position "C".

It will be appreciated that in other embodiments the floating component 394 can be permanently entrained in the holding component 393, for example, through an overmold manufacturing operation.

Referring to FIGS. 3-6, contact between the power transfer end 352 of the clutch spring 348 and the drive lug 384 will cause inner rotary member 336 to tend to rotate with the clutch spring 348. The rotary load on the inner rotary member 336 will resist rotation in the predetermined rotational direction, causing the helical coils of the clutch spring 348 to engages more tightly with the torque transfer surface 344 and thereby facilitate the transmission of rotary power from the input rotary clutch portion/outer rotary member 360 to the output rotary clutch portion/inner rotary member 335.

Due to the bias provided by the axial return spring 400 the armature holding component 393 rotates with the outer rotary member 360. Due to the bias provided by the coil spring 402 the floating component 394 will be situated in position "B" in the holding component 393 and the floating component 393 will also rotate with the armature holding component 393 and the outer rotary member 360.

To disengage the clutch assembly 300, the electromagnet 332 is energized. As the floating component 394 is situated in position "B" with the tabs 394*t* near the widest extent 393*w* of the pocket 393*p*, there is some free axial play between the floating component 394 and the holding component 393. The floating component 394 translates axially due to the applied magnetic force, without having to overcome the bias of the return spring 400. The floating component 394 is thus stopped. The holding component 393 continues to rotate. As it does, the holding component 393 axially translates due to the axially tapered pockets 393*p* which ride on the tabs 393*t* of the stopped floating component 394. As the holding component 393 rotates, the pockets 303*p* move relative to the tabs 394*t* to reach position "C", as which point the holding component 393 is stopped. The bias force of the return spring 400 is thus overcome in a condition where the air gap and reluctance of the magnetic circuit is minimized.

With the armature holding component 393 prevented from rotating, the armature 392 frictionally engages the electromagnet flange 332*f*, creating a drag force that slows the rotation of the armature 392 relative to the helical coils 348*c* of the clutch spring 348 (which tend to rotate with the torque transfer surface 344 of the outer rotary member 360) so that the armature 392, its control fork 388 and the clutch spring control end 356 rotate relative to the outer rotary member 360 in a direction opposite the predetermined rotational direction. This causes the helical coils of the clutch spring 348 to tend to contract and disengage from the torque transfer surface 344 thereby halting or limiting the rotary power that is input to the clutch spring 348 from the torque transfer surface 344 of the outer rotary member 360, and thus inhibit rotary power transferred to the inner rotary portion 336/output rotary clutch portion.

When the electromagnet 332 releases the floating component 394, the armature 392 returns to its initial axial position due to the bias force of the return spring 400, and the floating component 394 returns to the bias position "B" due to the angular position biasing spring 402.

The two-component armature 392 has been shown with the holding component 393 comprising a channel provisioned by the pockets 393*p* and the floating component 394 comprising a projection provided by the tabs 394*t*, which is entrained in the channel. In alternative embodiments the floating component 393 can comprise the channel and the holding component 393 can comprise a projection entrained by the channel.

The two component armature has also been shown with the holding member 393 comprising a variable depth channel in that the pockets 393*p* have wider and narrower axial extents 393*w*, 393*n*. However, in alternative embodiments the axial extent of the pockets 393*p* can be substantially uniform so long as an axial translation is provided between the armature components 393, 394 as they rotate relative to one another, similar to a threaded screw and nut combination, although it is not necessary that the threaded engagement or linkage between the armature components 393, 394 be helical per se. The angular position biasing spring 402 ensures that the armature components 393, 394 resides in a preferred axially extensible or telescoping condition with the floating component 394 closest to the electromagnet 332 while the electromagnet 332 is de-energized and clutch assembly 300 is engaged. When the clutch assembly 300 is disengaged through energization of the electromagnet 332, the armature components 393, 394 reside, at least temporarily, in an axially retracted or collapsed condition as result of the stoppage of floating component 394.

While the discussion of the foregoing two-component armatures has occurred in the context of a normally engaged, expanding type wrap spring clutch, those skilled in the art will appreciate that the two-component armature 392 can be applied to a normally disengaged, expanding type wrap spring clutch, where the axial return spring is biased to so as to inhibit the rotation of the armature as opposed to inducting its rotation. Likewise, those skilled in the art will appreciate that a two-component armature can be applied to a normally engaged or normally disengaged contracting type wrap spring clutch.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A rotary clutch assembly, comprising:
    a first rotary clutch portion that is disposed about a rotary axis and adapted to receive a rotary input;
    a second rotary clutch portion that is disposed about the rotary axis and adapted to be coupled to a rotary output;
    at least one of the first and second rotary clutch portions defining a clutch surface;
    a wrap spring clutch having a power transfer end, a control end and a plurality of helical coils between the power transfer end and the control end, the plurality of helical coils engaging the clutch surface, the wrap spring clutch being configured to transmit or interrupt flow of rotary power between the first rotary clutch portion and the second rotary clutch portion depending on a drag force applied to the control end of the wrap spring clutch; and
    an actuator that is selectively operable for generating said drag force, the actuator comprising an electromagnet, a two-component armature and an axial return spring, wherein the two-component armature comprises a first armature component, a second armature component threadingly connected to the first armature component whereby the first and second armature components are capable of relative axial translation as the first and second armature components rotate relative to one another, and an angular position biasing member connecting the first and second armature components, wherein the axial return spring is connected to the first armature component, and wherein the second armature component translates axially under magnetic force applied by the electromagnet and is stopped thereby, and the first armature component translates axially due to the threaded connection between the first and second armature components.

2. A rotary clutch assembly according to claim 1, wherein the angular position biasing member biases the first and second armature components towards an axially extensible condition.

3. A rotary clutch assembly according to claim 1, wherein the first armature component and the second armature component have a range of relative angular motion therebetween less than 360 degrees.

4. A rotary clutch assembly according to claim 1, wherein one of the first and second armature components includes a channel and the other of the first and second armature components includes a projection constrained by the channel, wherein the channel and projection enable the first and second armature components to translate axially relative to one another as the first and second armature components rotate relative to one another.

5. A rotary clutch assembly according to claim 4, wherein the channel has a wide cross-sectional area and a narrow cross-sectional area, and the angular position biasing member biases the armature component having the projection to a position where the projection is disposed in the wide cross-sectional area.

6. A rotary clutch assembly according to claim 1, wherein the second armature component is positionable to a first angular position relative to the first armature component where the second armature component has axial play relative to the first armature component, and wherein the second armature component is positionable to a second angular position relative to the first armature component where the first armature component has substantially no axial play relative to the first armature component, the angular position biasing member biasing the second armature component to the first angular position.

7. A rotary clutch assembly, comprising:

a first rotary clutch portion that is disposed about a rotary axis and adapted to receive a rotary input;

a second rotary clutch portion that is disposed about the rotary axis and adapted to be coupled to a rotary output;

at least one of the first and second rotary clutch portions defining a clutch surface;

a wrap spring clutch having a power transfer end, a control end and a plurality of helical coils between the power transfer end and the control end, the plurality of helical coils engaging the clutch surface, the wrap spring clutch being configured to transmit or interrupt flow of rotary power between the first rotary clutch portion and the second rotary clutch portion depending on a drag force applied to the control end of the wrap spring clutch; and an actuator that is selectively operable for generating said drag force, the actuator comprising an electromagnet, a two-component armature and an axial return spring;

wherein the two-component armature comprises a holding component, a floating component entrained with the holding component, and an angular position biasing member connecting the floating and holding components;

wherein the floating component is positionable to a first angular position relative to the holding component where the floating component has axial play relative to the holding component and wherein the floating component is positionable to a second angular position relative to the holding component where the floating component has substantially no axial play relative to the holding component;

wherein the angular position biasing member biasing the floating component to the first angular position;

wherein the axial return spring is connected to the holding component;

wherein, in operation, the floating component translates axially under magnetic force applied by the electromagnet without having to overcome the bias of the axial return spring to thereby stop the floating component, whereby the holding component moves to the second angular position and translates axially due to mechanical linkage between the holding and floating components, overcoming the bias of the axial return spring.

* * * * *